US009399569B2

(12) United States Patent
Smith et al.

(10) Patent No.: US 9,399,569 B2
(45) Date of Patent: Jul. 26, 2016

(54) RECYCLABLE VALVE CLOSURE FOR KEG

(75) Inventors: Andrew Smith, Durham (GB); Sergio Sonzogni, Grassobbio (IT); Philip Andrew Walton, Durham (GB)

(73) Assignee: PET ENGINEERING U SERVICES S.R.L., Grassobbio (IT)

( * ) Notice: Subject to any disclaimer, the term of this patent is extended or adjusted under 35 U.S.C. 154(b) by 299 days.

(21) Appl. No.: 13/261,546

(22) PCT Filed: Jun. 23, 2011

(86) PCT No.: PCT/GB2011/051178
§ 371 (c)(1),
(2), (4) Date: Apr. 9, 2013

(87) PCT Pub. No.: WO2011/161456
PCT Pub. Date: Dec. 29, 2011

(65) Prior Publication Data

US 2013/0192691 A1 Aug. 1, 2013

(30) Foreign Application Priority Data

Jun. 24, 2010 (GB) .................................. 1010660.7
Nov. 5, 2010 (GB) .................................. 1018726.8

(51) Int. Cl.
*B67D 7/72* (2010.01)
*F04F 1/00* (2006.01)
*F04F 1/18* (2006.01)
*F16F 1/06* (2006.01)
*B67D 1/08* (2006.01)

(52) U.S. Cl.
CPC ............ *B67D 1/0808* (2013.01); *B67D 1/0832* (2013.01); *B67D 1/0835* (2013.01); *B67D 1/0807* (2013.01); *B67D 1/0831* (2013.01); *Y10T 137/613* (2015.04)

(58) Field of Classification Search
CPC .. B67D 1/0807; B67D 1/0808; B67D 1/0831; B67D 1/0832
USPC ........... 137/206, 212; 267/166, 167, 180, 182
See application file for complete search history.

(56) References Cited

U.S. PATENT DOCUMENTS 3,596,810 A * 8/1971 Taubenheim ........ B67D 1/0832 137/212
3,967,811 A * 7/1976 Keller, III ............. F16K 5/0414 251/175
4,368,831 A * 1/1983 Bailey ........................ 222/400.7
(Continued)

FOREIGN PATENT DOCUMENTS

EP 1 095 900 A1 5/2001

*Primary Examiner* — Kevin Murphy
*Assistant Examiner* — Kelsey Rohman
(74) *Attorney, Agent, or Firm* — Ira S. Dorman

(57) ABSTRACT

A fully recyclable valve housing for engagement with a neck of a container, such as a beer keg, has an inner port for liquid and a concentric outer port for pressurized gas, with openings for admitting pressurized gas into the container. A dip tube is connected to a bottom end fitting, communicating with a valve stem within the valve housing. A valve member controls flow through the concentric ports, and a spring element located about the valve stem urges the valve member upwards to close the ports. The spring element is molded from a resilient polymeric material and comprises a plurality of C-shaped sections angularly arranged in two interconnected stacks on opposite sides of the valve stem such that movement of the valve member causes concurrent resilient deformation of all the sections.

3 Claims, 1 Drawing Sheet

(56) References Cited

U.S. PATENT DOCUMENTS

| | | | | |
|---|---|---|---|---|
| 4,665,940 | A | 5/1987 | Jacobson | |
| 5,108,015 | A | 4/1992 | Rauworth | |
| 2002/0158392 | A1 * | 10/2002 | Petrina | 267/168 |
| 2010/0116356 | A1 * | 5/2010 | Wauters | 137/317 |

* cited by examiner

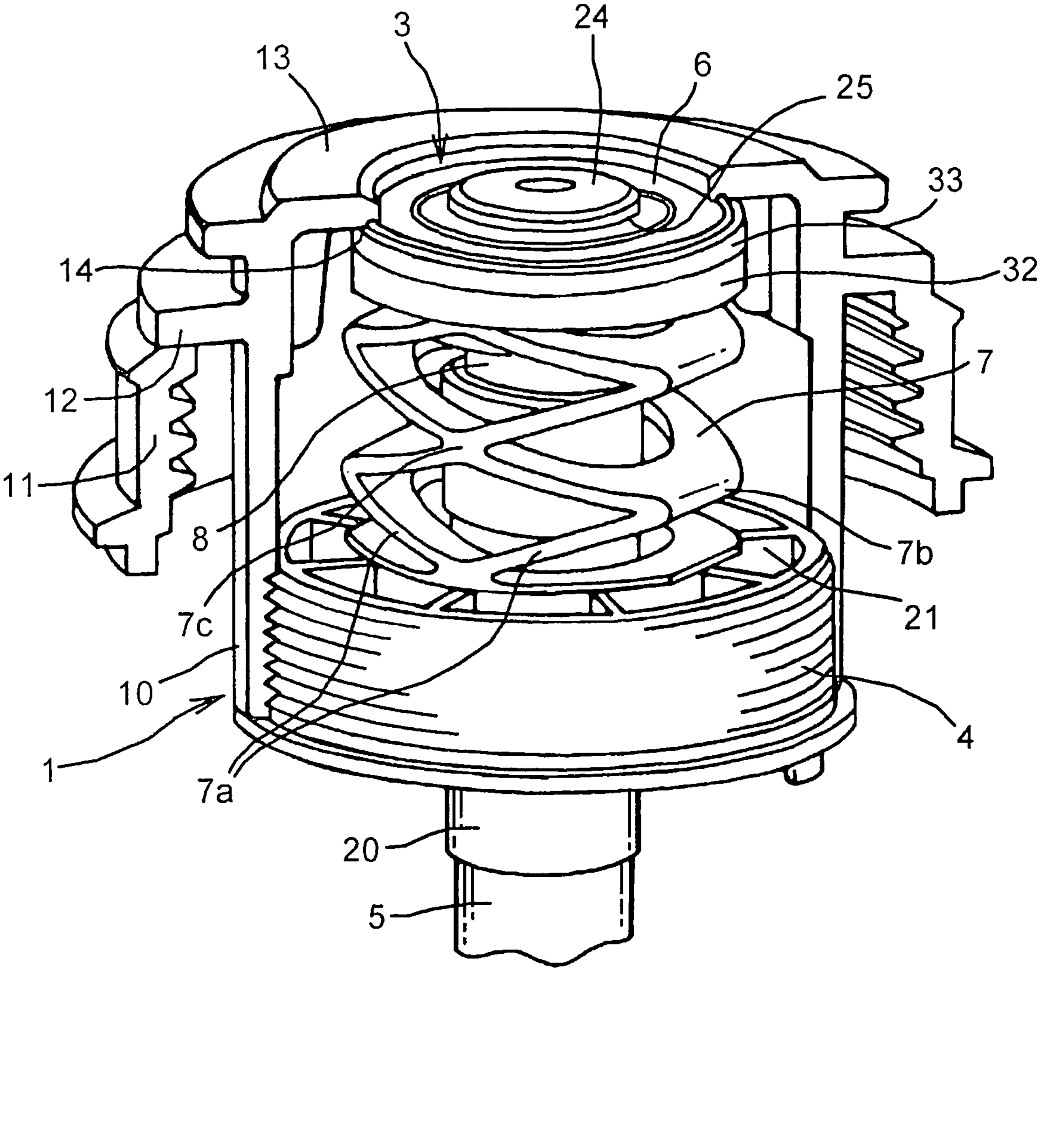
3
24
13
6
25
33
14
32
12
7
11
8
7b
7c
21
10
4
1
7a
20
5

RECYCLABLE VALVE CLOSURE FOR KEG

TECHNICAL FIELD OF THE INVENTION

This invention relates to closures which incorporate valves. Such closures are used with containers such as beer kegs from which the liquid contents are dispensed by gas pressure.

BACKGROUND

A common form of valve closure, known as an A-type valve, is often used with beer kegs. A single spring-loaded annular valve element controls two ports. When engaged with a suitable valve-operating member, gas can be fed into the container past the outer periphery of the valve element while beer simultaneously flows out of the container past the inner periphery of the element.

Other forms of valve closure may also be used with beer kegs. For example, in S-type valves the two ports are controlled by inner and outer concentric valve members which are spring-loaded to close inner and outer passages within the valve closure. Generally the valve members are operated by respective spring elements, although the valve members may be cascaded such that one spring-loaded valve member causes closure of the other.

Traditional valve closures are designed to have a long working life. They are predominantly metal and are relatively expensive. On the other hand, single-use beer kegs are becoming more popular because they minimise the environmental cost of transporting heavy beer kegs over long distances. Stripping down a beer keg to remove different components is a labour-intensive process, and ideally the entire beer keg should be capable of being recycled after a single use with a minimum amount of manual intervention.

An objective of the present invention is to provide a valve closure which can be formed of inexpensive materials and which can be recycled without separation of its various components but which nevertheless performs the necessary sealing functions effectively and reliably.

SUMMARY OF THE INVENTION

The present invention proposes a valve closure for containers which includes:

- a valve housing adapted for engagement with a neck of a container, an upper end of the valve housing having an inner port for liquid and a concentric outer port for pressurised gas, and the valve housing having one or more openings for admitting pressurised gas from the outer port into the container;
- a dip tube assembly having an end portion within the valve housing and which projects downwardly from a lower end of the valve housing for conducting liquid from the container through the inner port;
- at least one valve member arranged to control flow through one or both of the said ports; and
- a spring element urging the valve member upwards to close the respective port, or ports, the valve member being movable in use against the closing action of the spring element by means of a valve-opening member, in which the spring element is moulded from a resilient polymeric material and comprises a plurality of interconnected sections arranged such that movement of the valve member by the valve-operating member causes resilient deformation of the interconnected sections.

Since all of the components of the valve closure can be formed of similar polymeric materials it is possible to recycle the entire closure without stripping out any of the individual components.

Although the interconnected sections could be connected in parallel they are preferably arranged in a stack. Such an arrangement involves less deformation of the individual elements for a given amount of compression, increases the compressive range of the spring element, and reduces the risk of creep. The stacked sections are preferably angularly inclined with respect to each other. This results in mainly flexing deformation of the elements and minimal torsional deformation.

In a preferred configuration the interconnected sections are arranged in two stacks which are interconnected at alternate junctions between adjacent sections. Such an arrangement increases the total strength of the spring element with minimal reduction in compressive range. Each of the interconnected sections is preferably substantially C-shaped, so that the spring element is substantially C-shaped, and the stacks are preferably interconnected at the ends of the C-shapes.

In a preferred valve configuration the dip tube assembly includes a hollow valve stem containing at least one side port with a cap closing the upper end of the stem and forming an inner downwardly-directed valve seat surrounding the stem. The valve member is preferably of annular shape and is located about the stem, the inner port is formed between the valve member and the stem and the outer port is formed between the valve member and an outer downwardly-directed valve seat, and a single spring element urges the valve member upwards against the valve seats to close the inner and outer ports.

BRIEF DESCRIPTION OF THE DRAWINGS

The following description and the accompanying drawings referred to therein are included by way of non-limiting example in order to illustrate how the invention may be put into practice. In the drawings:

FIG. 1 is a general view of an A-type valve closure in accordance with the invention, shown in a closed condition and partially sectioned.

DETAILED DESCRIPTION OF THE DRAWINGS

Referring to FIG. 1, the valve closure shown in the drawing is of the kind known as an A-type valve. All components of the valve may be moulded of polymeric materials (plastics) so that the closure is fully recyclable.

The valve comprises a valve housing 1 which is adapted to be fitted onto the neck of a beverage container such as a beer keg. The housing is injection moulded from a suitable polymeric material and has an inner cylindrical wall 10 and an outer cylindrical wall 11 connected by an annular bridging wall 12. The outer wall has internal threads to screw onto the neck of a beer keg or similar container which seals against bridging wall 12 by means of a suitable interposed sealing ring (not shown) to withstand differential gas pressure. The upper end of the housing 1 is provided with an integral annular cover 13, the inner periphery of which forms an outer downwardly-directed valve seat 14 surrounding a central mouth 3. The bottom end of the valve housing 1 is screw-threaded to non-sealingly receive a bottom end fitting 4. The fitting is preferably secured by two interleaving threads having the same pitch as the threads of the outer wall 11 to simplify removal from the injection mould. The fitting 4 could also be secured by other means such as a bayonet fixing.

The bottom end fitting incorporates a co-axial sleeve 20 surrounded by axial openings 21 for admitting pressurised gas into the container. A dip tube 5, which is used for conducting liquid out of the container, is an interference fit in the lower end of the sleeve 20 and a valve stem 8 is engaged within the upper end of the sleeve 20.

Valve stem 8 is open at the lower end but closed at the upper end by an integral cap 24 which projects outwardly to form a second downwardly-directed valve seat 25 surrounding the stem 8. Below the cap 24 the valve stem contains side ports (not shown).

A compression spring 7, which is also injection moulded of a resilient polymeric material, is located about the sleeve 20. The spring element 7 comprises a plurality of C-shaped sections 7*a* which are arranged in a stack about the sleeve 20. On each side of the sleeve, the stacked sections 7*a* are angularly arranged in a zigzag configuration, with connected mid regions 7*b* alternating with connected end regions 7*c*. Furthermore, the end connections 7*c* of the sections on both sides of the stack are joined together in the shape of an X. In the assembled valve, one end of the spring 7 bears against the bottom end fitting 4 while the opposite upper end bears against a valve member 6, urging the valve member upwards against the valve seats 14 and 25 to close the mouth 3. The valve member may comprise a rigid support element 32 and a flexible sealing element 33 which is shaped to seal against the two valve seats. The inner margin of the sealing element 33 also forms a sliding seal with the valve stem 8.

When the valve member 6 is engaged with a valve-operating member (not shown), the valve member is pressed below the ports in the valve stem 8 compressing spring 7 to cause concurrent resilient flexing deformation of the spring sections 7*a*. The sealing element 33 makes sealing contact with the valve-operating member to provide separate gas and liquid flow paths through the operating member. The element 33 also seals against the valve stem 8 and the sleeve 20 providing a closed seal between the two and preventing entry of pressurised gas into the liquid flowing through stem 8. Pressurised gas is fed into the container through the operating member, passing around the outside of the sealing element 33 and through the valve housing 1 to exit into the container through the openings 21. The increased pressure within the container causes liquid to flow up the dip tube 5 and exit through the valve-operating member via the ports in the valve stem 8.

When the valve-operating member is withdrawn the resilience of the spring sections 7*a* causes the spring to return the valve member 6 into sealing engagement with the valve seats 14 and 25, thereby re-closing the valve.

The spring element 7 is easily formed by injection moulding and is capable of maintaining good closing pressure on the valve member 6 without significant risk of creep. The valve closure may thus be formed entirely of polymeric materials so that the closure can be recycled without requiring separation of the individual components.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A fully recyclable valve closure for containers, including:

a valve housing (1) adapted for engagement with a neck of a container, an upper end of the valve housing having an inner port (25) for liquid and a concentric outer port (14) for pressurised gas, and the valve housing having one or more openings (21) for admitting pressurised gas from the outer port into the container;

a dip tube assembly (20, 8, 24) having an end portion (8) within the valve housing and which projects downwardly from a lower end of the valve housing for conducting liquid from the container through the inner port (25);

at least one valve member (6) arranged to control flow through one or both of the said ports; and a spring element (7) urging the valve member upwards to close the respective port, or ports, the valve member (6) being movable in use against the closing action of the spring element, in which the spring element is injection moulded from a resilient polymeric material and comprises a plurality of C-shaped sections (7*a*) arranged in two stacks on opposite sides of the dip tube assembly (20, 8, 24), each of said C-shaped sections (7*a*) being joined to a first upwardly or downwardly adjacent C-shaped section (7*a*) of the respective stack at a mid region (7*b*) and also being joined to a second C-shaped section (7*a*) of the same stack at two end connections (7*c*), said two stacks on opposite sides of the dip tube assembly (20, 8, 24) being joined together at said end connections (7*c*), and the spring element (7) being arranged such that movement of the valve member (6) against said closing action of the spring element causes resilient deformation of the C-shaped sections (7*a*), the spring element (7) being located in a pathway which the pressurized gas takes from the outer port (14) to said one or more openings (21); said valve closure being formed entirely of polymeric materials so as to render it fully recyclable.

2. A valve closure according to claim 1 in which the dip tube assembly includes a hollow valve stem (8) with a cap (24) closing the upper end of the stem and forming an inner downwardly-directed valve seat surrounding the stem.

3. A valve closure according to claim 2 in which the valve member (6) is of annular shape and is located about the hollow valve stem (8) forming a sliding seal with the stem (8), the inner port (25) is formed between the valve member and the stem and the outer port (14) is formed between the valve member and an outer downwardly-directed valve seat (13), and a single spring element (7) urges the valve member upwards against the valve seats (24, 13) to close the inner and outer ports (25, 14).

* * * * *